(12) United States Patent
Booth et al.

(10) Patent No.: US 8,162,397 B2
(45) Date of Patent: Apr. 24, 2012

(54) ADJUSTABLE SEAT ASSEMBLY

(75) Inventors: Daniel W. Booth, Warren, MI (US);
Robert L. Demick, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 537 days.

(21) Appl. No.: 12/262,328

(22) Filed: Oct. 31, 2008

(65) Prior Publication Data
US 2010/0109401 A1    May 6, 2010

(51) Int. Cl.
*A47C 7/14* (2006.01)
(52) U.S. Cl. ............ 297/284.11; 297/284.3; 297/452.18
(58) Field of Classification Search ............... 297/284.3, 297/284.11, 312, 452.18, 452.55, 452.56
See application file for complete search history.

(56) References Cited

U.S. PATENT DOCUMENTS

| | | | |
|---|---|---|---|
| 3,446,532 A | | 5/1969 | Cramer |
| 4,652,049 A | * | 3/1987 | Maruyama et al. ...... 297/284.11 |
| 4,693,513 A | * | 9/1987 | Heath ....................... 297/284.11 |
| 5,362,128 A | * | 11/1994 | Wildern, IV ............. 297/284.11 |
| 5,370,444 A | * | 12/1994 | Stulik ....................... 297/284.11 |
| 6,454,353 B1 | * | 9/2002 | Knaus ....................... 297/284.11 |
| 7,093,897 B2 | * | 8/2006 | Terrand et al. ........... 297/284.11 |
| 7,871,126 B2 | * | 1/2011 | Becker et al. ............. 297/284.11 |

FOREIGN PATENT DOCUMENTS
WO        2005051705 A1    6/2005

* cited by examiner

*Primary Examiner* — David Dunn
*Assistant Examiner* — Philip Gabler
(74) *Attorney, Agent, or Firm* — Quinn Law Group, PLLC

(57) ABSTRACT

An adjustable seat assembly for a vehicle includes a frame and a covering. The covering has a first portion and a second portion. A flexure region, having an arched shape, is disposed between the first portion and the second portion. The covering at least partially extends over the frame to the first portion. An adjustment mechanism is operatively connected to the covering, at the first portion. The first portion and the second portion define a linear distance therebetween. The adjustment mechanism is configured to move the first portion relative to the second portion such that the flexure region moves to change the linear distance between the first portion and the second portion.

18 Claims, 3 Drawing Sheets

ADJUSTABLE SEAT ASSEMBLY

TECHNICAL FIELD

The present invention relates to an adjustable seat assembly for use in a vehicle.

BACKGROUND OF THE INVENTION

A typical seat for a vehicle includes a frame and a covering. The frame is attached to a floor of the vehicle and extends generally horizontally and the covering extends over a portion of the frame. The covering presents a surface for a user of the vehicle to sit upon. The covering extends to a front edge. When the user is seated on the surface of the covering, the thighs of the user may or may not be supported by the covering proximate the front edge of the seat. However, when the thighs of the user extend beyond the front edge, the user's thighs are not being supported by the seat. When the user's thighs are not supported by the seat, the user may be uncomfortable while seated upon the surface of the seat.

SUMMARY OF THE INVENTION

An adjustable seat assembly attaches to a floor of a vehicle to support thighs of a user of the vehicle. The adjustable seat assembly includes a frame and a covering. The frame presents a support surface that extends generally horizontally. The covering includes a first portion and a second portion in spaced relationship to the first portion. The second portion extends over the support surface and the first portion is horizontally spaced from the second portion and the frame. A front edge is defined at a tangent to the covering, between the first portion and the second portion, at a maximum horizontal distance from the frame. At least a portion of the covering between the front edge and the second portion supports the thighs of the user of the vehicle. The covering includes a flexure region between the first portion and the second portion such that as the first portion is moved relative to the frame, the flexure region moves between a relaxed position and a tensioned position to change the maximum horizontal distance between the frame and the front edge. An adjustment mechanism is operatively connected to the covering and the frame such that the adjustment mechanism is configured to selectively retain the first portion relative to the second portion.

A method is provided for adjusting a seat assembly for supporting thighs of a user of a vehicle. The seat assembly includes a frame and a covering having a first portion and a second portion with a flexure region therebetween. An adjustment mechanism that is operatively connected to the covering is provided. The first portion is selectively moved relative to the frame to move the flexure region to one of a relaxed position and at least one of a plurality of tensioned positions. The adjustment mechanism is engaged with a flange extending from the frame to lock the first portion in the one of the relaxed position and the at least one of the plurality of tensioned positions.

An adjustable seat assembly is provided for attachment to a floor of a vehicle to support thighs of a user of the vehicle. The adjustable seat assembly includes a frame and a covering. The frame presents a support surface that extends generally horizontally. The covering includes a first portion and a second portion in spaced relationship to the first portion. The second portion extends over the support surface and the first portion is horizontally spaced from the second portion and the frame. A front edge is defined at a tangent to the covering, between the first portion and the second portion, at a maximum horizontal distance from the frame such that at least a portion of the covering between the front edge and the second portion supports the thighs of the user of the vehicle. The covering includes a flexure region between the first portion and the second portion such that as the first portion is moved relative to the frame, the flexure region moves between a relaxed position and at least one of a plurality of tensioned positions to change the maximum horizontal distance between the frame and the front edge. A flange extends from the frame. An adjustment mechanism is operatively connected to the covering, proximate the first portion. The adjustment mechanism is configured to selectively engage the flange and retain the first portion relative to the second portion.

Accordingly, because each user of the vehicle may be a different height with legs of a unique length, the adjustment mechanism allows each user to move the flexure region between the relaxed position and a tensioned position allowing the user to adjust the seat to a desired length that supports that user's thighs.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
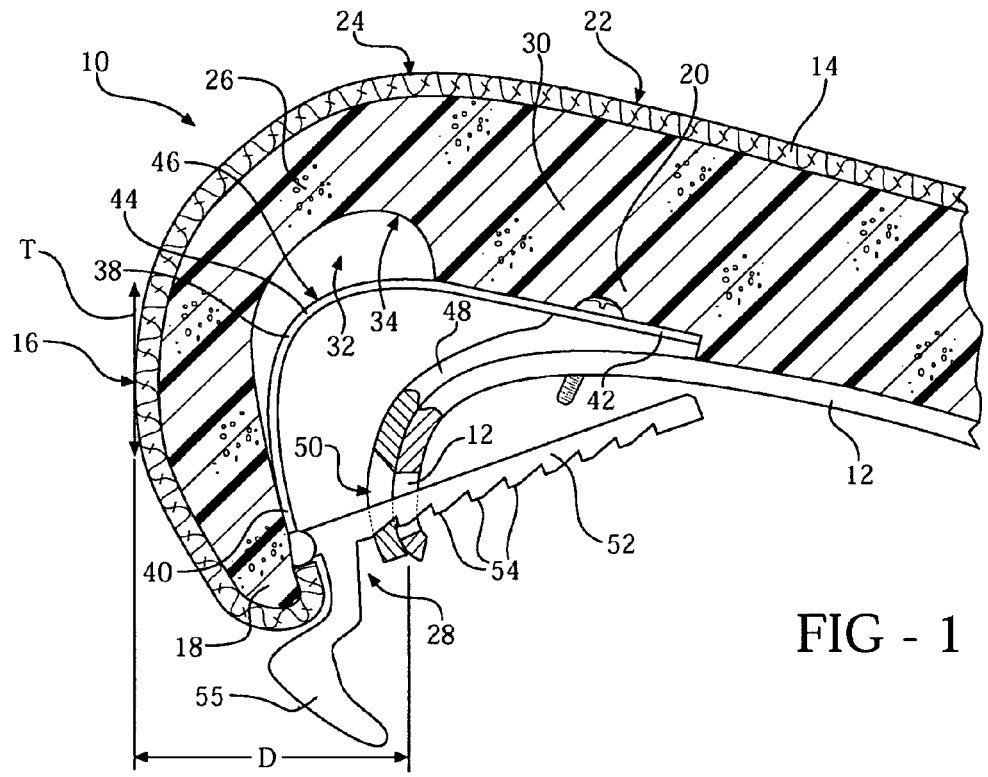
FIG. 1 is a cross sectional side view of a portion of a frame and a covering of a seat assembly with an adjustment mechanism having a thigh portion in a lowered position with a latch bar engaging an engagement slot of a flange.

Referring to the drawings, wherein like reference numbers refer to like components, FIG. 1 shows an adjustable seat assembly 10 for a vehicle (not shown). The seat assembly 10 includes a frame 12 that extends generally horizontally. A covering 14 extends over the support surface of the frame 12. The seat assembly 10 extends to a front edge 16. The frame 12 may be attached to a floor (not shown) of the vehicle and the frame 12 may extend generally horizontally within the vehicle, i.e., generally parallel with the floor. The frame 12 may be formed of metal, plastic, or any other material known to those skilled in the art.

Figure 2:
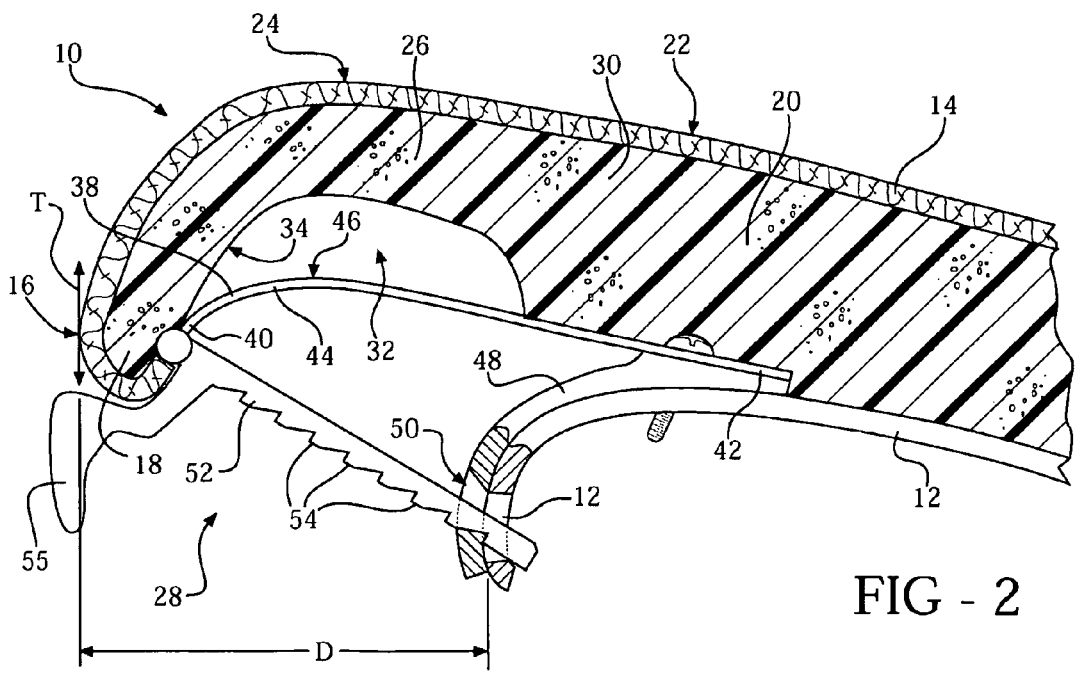
FIG. 2 is a cross sectional side view of the portion of the frame and the covering of the seat assembly of FIG. 1 with the adjustment mechanism having the thigh portion in a raised position and the latch bar engaging the engagement slot of the flange.
Figure 3:
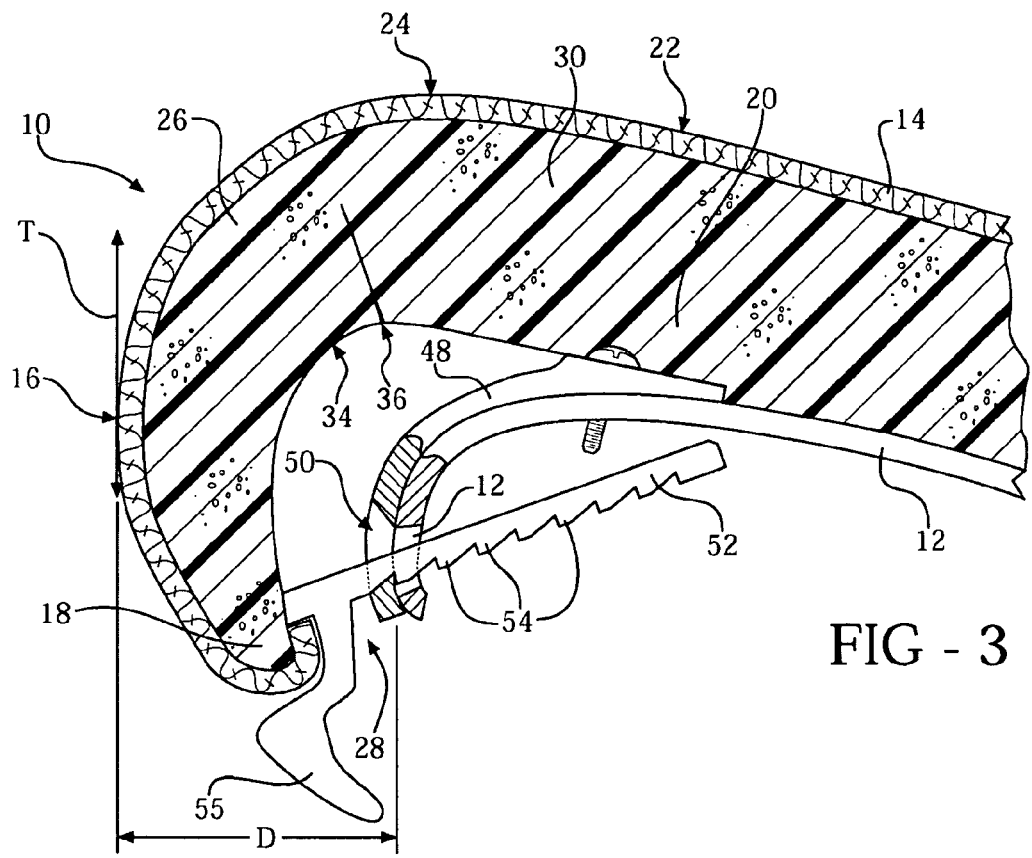
FIG. 3 is a cross sectional side view of an alternative embodiment of the seat assembly of FIG. 1 without the thigh portion and with the adjustment mechanism in the lowered position and the latch bar engaging the engagement slot of the flange.
Figure 4:
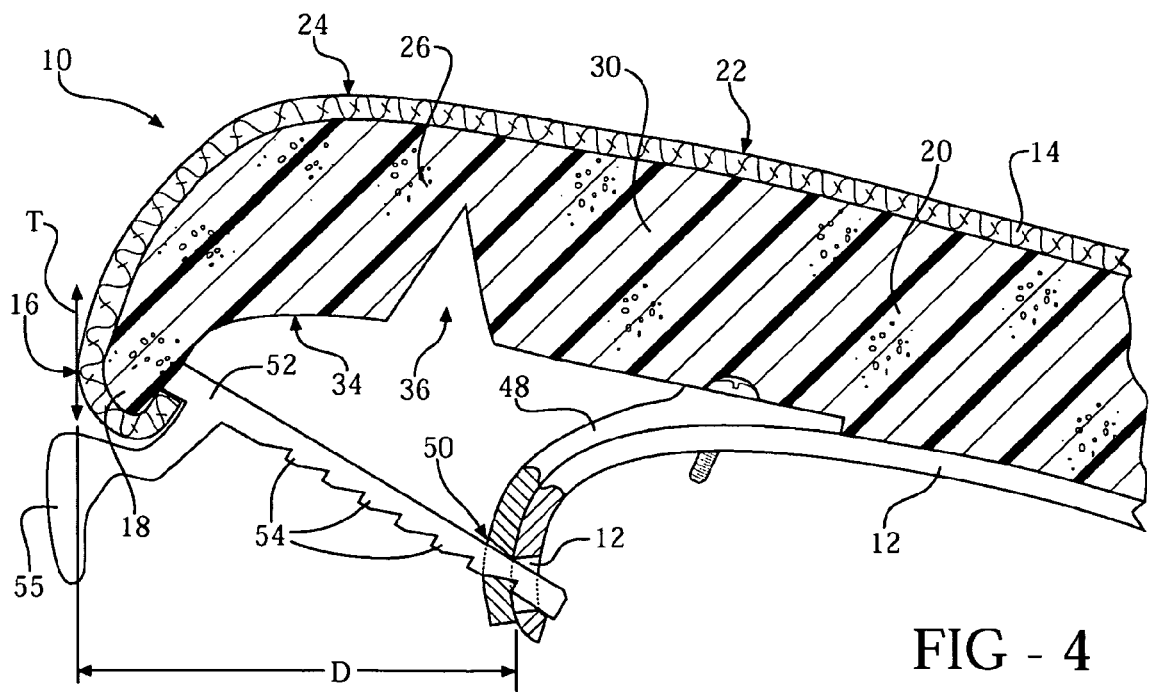
FIG. 4 is a cross sectional side view of the seat assembly of FIG. 3 with the adjustment mechanism in the raised position and the latch bar engaging the engagement slot of the flange.
Figure 5:
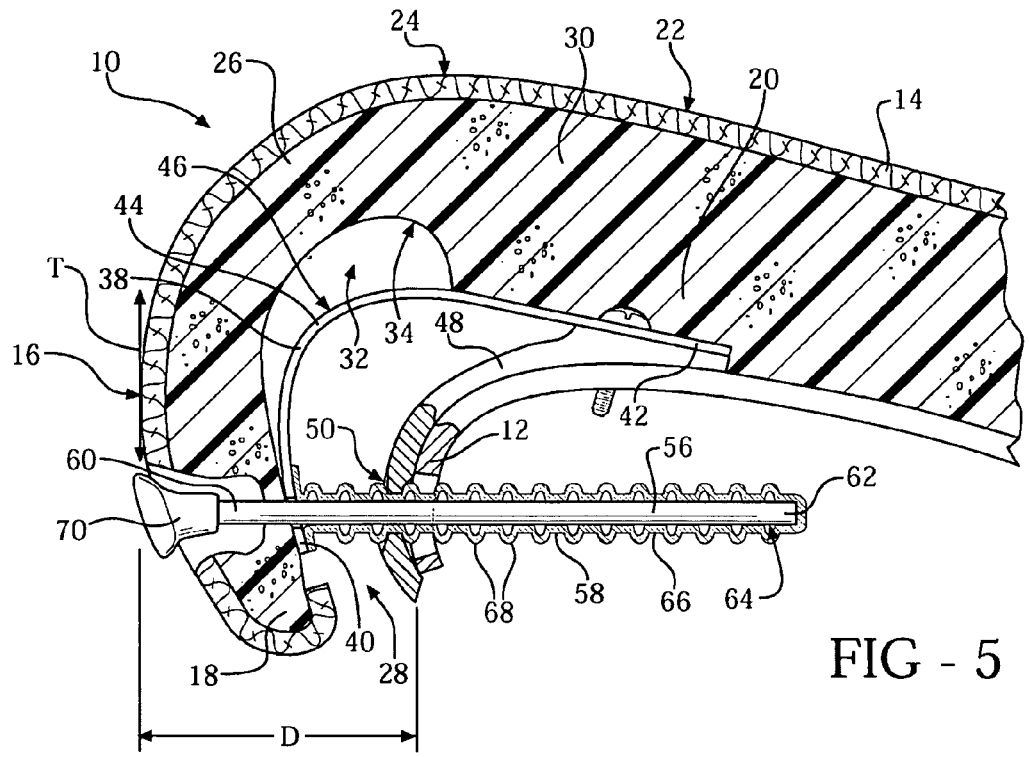
FIG. 5; is a cross sectional side view of another embodiment of the seat assembly of FIG. 1 with the adjustment mechanism in the lowered position and the corrugations on the sheath engaging the engagement slot of the flange.
Figure 6:
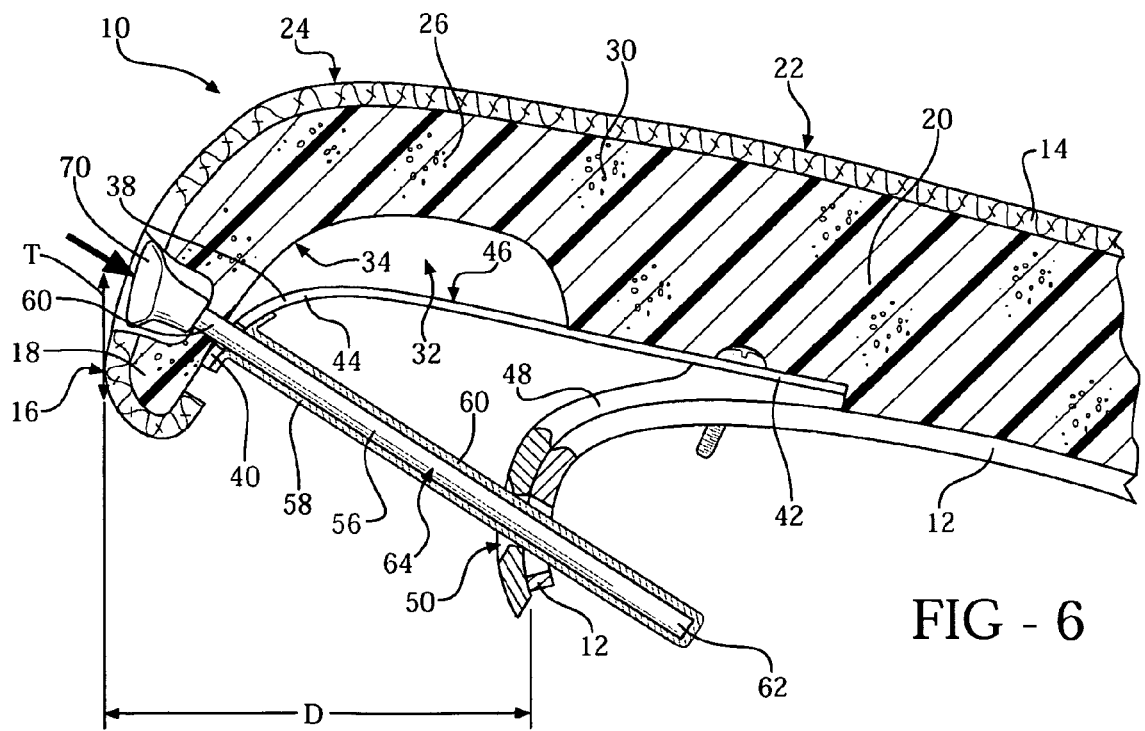
FIG. 6 is a cross sectional side view of another embodiment of the seat assembly of FIG. 5 with the adjustment mechanism having the thigh portion in the raised position and corrugations on a sheath engaging the engagement slot of the flange.

The covering 14 may be fabric, leather, or any other material known to those skilled in the art for covering the seat assembly 10. The covering 14 includes a first portion 18 and a second portion 20 in spaced relationship to the first portion 18. The second portion 20 extends over the support surface of the frame 12 to provide a seating surface 22 for a user of the vehicle to sit upon. The first portion 18 is horizontally spaced from the second portion 20 and the frame 12. The front edge 16 extends along the covering 14 at a tangent T to the covering 14 that is between the first portion 18 and the second portion 20 and at a maximum horizontal distance D from the frame 12. Therefore, a support region 24 is defined by the covering 14 that is between the front edge 16 and the second portion 20 for supporting the thighs of the user of the vehicle. A flexure region 26 is disposed between the first portion 18 and the second portion 20. The flexure region 26 is bendable and may have an arched shape such that the covering 14 is movable between a relaxed position, as shown in FIGS. 1, 3, and 5, and a tensioned position, as shown in FIGS. 2, 4, and 6 to change the maximum horizontal distance D between the frame 12 and the front edge 16. This means that the first portion 18 arches about the flexure region 26, toward the floor of the vehicle. When the covering 14 is in the relaxed position, the front edge 16 and the flexure region 26 may generally correspond with the front edge 16 of the seat assembly 10 and for supporting the thighs of some users of the vehicle. However, other users of the vehicle may have longer legs that would go unsupported by the covering 14 between the front edge 16 and the second portion 20 when the flexure region 26 is in the relaxed position. Therefore, the first portion 18 may be moved relative to the second portion 20, i.e., away from the floor of the vehicle to the tensioned position. When the first portion 18 is moved away from the floor of the vehicle, the flexure region 26 unrolls and the front edge 16 of the seat assembly 10 moves horizontally away from the frame 12 to the desired maximum horizontal distance D to elongate the seat assembly 10. As a result, the portion of the covering 14 between the front edge 16 and the second portion 20 supports the user's thighs. Therefore, to provide additional support to the thighs of the users with the longer legs, the first portion 18 may be moved away from the floor and unbent at the flexure region 26 to extend the support region 24 and bring the support region 24 into contact with the user's thighs.

An adjustment mechanism 28 is provided to facilitate the movement of the first portion 18 relative to the second portion 20, about the flexure region 26. The adjustment mechanism 28 may be operatively connected to the covering 14, proximate the first portion 18, to selectively move the first portion 18 and change the maximum horizontal distance D between the front edge 16 and the frame 12 such that the front edge 16 moves relative to the frame 12 to selectively support the thighs of the user with the support region 24. As the adjustment mechanism 28 is moved, the first portion 18 moves relative to the frame 12 and the floor of the vehicle. As stated above, the movement of the first portion 18 flexes, i.e., tensions, or unflexes i.e., relaxes, the flexure region 26 to change the maximum horizontal distance D between the front edge 16 and the frame 12 to any desired distance such that the support region 24 provides support to the thighs of the user. The flexure region 26 may be resilient. Therefore, as the flexure region 26 is moved from a neutral or relaxed position to change the maximum horizontal distance D and the first portion 18 is released and not otherwise restrained, the resiliency of the flexure region 26 will act to naturally return the first portion 18 back to the neutral position without the use of additional force by the user.

The covering 14 may include a cushion 30 that is disposed over at least a portion of the frame 12. The cushion 30 provides additional support and comfort to the user. The cushion 30 may be resilient such when the first portion 18 of the covering 14 is moved relative to the second portion 20, about the flexure region 26, to move the front edge 16 of the covering 14 relative to the frame 12, the resiliency of the covering 14 at the flexure region 26 will return the first portion 18 to the relaxed position when the first portion 18 is released. The cushion 30 may be formed from foam, such as polyurethane foam, and the like. It should be appreciated, however, that the cushion 30 is not limited to being formed from foam, but may be formed from any other material known to those skilled in the art. A relief 32 may be defined in the flexure region 26 of the cushion 30, as shown in FIGS. 1, 2, 5, and 6. A concave surface 34 may partially surround the relief 32 to prevent the cushion 30 from gathering at the flexure region 26 when the first end 60 is moved toward the second end 62 to shorten the linear distance between the first end 60 and the second end 62. In another embodiment, the concave surface 34 of the covering 14 may define a slit 36, as shown in FIGS. 3 and 4. The slit 36 allows the cushion 30 to extend or lengthen when the first portion 18 is moved away from the second portion 20 to increase the, maximum horizontal distance D between the front edge 16 and the frame 12.

The seat assembly 10 may also include a thigh portion 38 for supporting the user's thighs. The thigh portion 38 extends between a first part 40 and a second part 42. A flexure portion 44, having an arched shape, is disposed between the first part 40 and the second part 42 of the thigh portion 38. The first part 40 extends from the first portion 18 of the covering 14 and the second part 42 extends from the second portion 20 of the covering 14. The thigh portion 38 is operatively disposed between the covering 14 and the frame 12. The second part 42 of the flexure portion 44 may be fastened or adapted to extend from the frame 12, as shown in FIGS. 1, 2, 5, and 6. The flexure portion 44 of the thigh portion 38 includes a convex surface 46. The convex portion of the thigh portion 38 faces the convex portion of the covering 14. The concave surface 34 of the covering 14 and the convex surface 46 of the thigh portion 38 may define the relief 32 therebetween. The flexure portion 44 of the thigh portion 38 may be resilient. This means that the thigh portion 38 may be formed from a material, such as spring steel, plastic, and the like that returns to an original predetermined shape when the first end 60 of the thigh portion 38 is not restrained. For example, referring to FIGS. 1, 2, 5, and 6, the thigh portion 38 is formed to have a general C-shape. As the first end 60 is moved away from the second end 62, i.e., the thigh portion 38 is elongated or generally straightened. However, the thigh portion 38 automatically returns to the original C-shape when the first end 60 of the thigh portion 38 is released. Therefore, the resiliency of the thigh portion 38 aids in returning the covering 14 and the thigh portion 38 to the relaxed position. However, when it is desired to lengthen the support region 24 that is defined between the front edge 16 and the frame 12, the adjustment mechanism 28 is used to maintain the extended position, as desired.

A flange 48 may extend from the frame 12, toward the floor of the vehicle. The flange 48 may be fastened or adapted to extend from the frame 12 or may be integral to the frame 12. The flange 48 defines an engagement slot 50. The adjustment mechanism 28 is configured to adjustably extend through the engagement slot 50 for selectively positioning the adjustment mechanism 28 relative to the flange 48. This means that the adjustment mechanism 28 selectively and adjustably interconnects the first portion 18 of the cushion 30 and the flange 48 to maintain the first portion 18 relative to the second portion 20 such that the user's thighs are supported by the support region 24 of the covering 14.

Referring to FIGS. 1-4, the adjustment mechanism 28 may be a latch bar 52. The latch bar 52 may be formed from aluminum, steel, plastic, or any other suitable material known to those skilled in the art. The latch bar 52 defines a plurality of teeth 54 for engaging the flange 48 as the latch bar 52 extends through the engagement slot 50. Engagement of the teeth 54 with the flange 48 retains the first portion 18 in a locked position such that the maximum horizontal distance D of the front edge 16 relative to the frame 12 is maintained at a fixed distance. The latch bar 52 may pivotally extend from the first portion 18 of the covering 14. The adjustment mechanism 28 may also include a handle 55 that extends from the latch bar 52. The user grasps the handle 55 and manually moves the latch bar 52 and the first portion 18 of the covering 14 relative to the second portion 20 to move the front edge 16 horizontally relative to the frame 12 to set the maximum horizontal distance D between the front edge 16 and the frame 12. The user moves the latch bar 52 such that at least one of the teeth 54 of the latch bar 52 engage the flange 48 from within the engagement slot 50 to maintain the maximum horizontal distance D between the front edge 16 and the frame 12.

In an alternate embodiment, as shown in FIGS. 5 and 6, the adjustment mechanism 28 includes a rod 56 and a sheath 58. The rod 56 extends along a length between a first end 60 and a second end 62. The sheath 58 defines a cavity 64 and has a wall 66 that surrounds the cavity 64 along the length. The sheath 58 may be configured to be elastic. When the sheath 58 is not stretched, the elastic retracts and forms a plurality of corrugations 68 along the wall 66 of the sheath 58, as shown in FIG. 5. However, when the sheath 58 is stretched or otherwise elongated, the wall 66 is generally straight, as shown in FIG. 6. The rod 56 slidably extends into the cavity 64 of the sheath 58, along the length, such that the wall 66 surrounds a portion of the rod 56 that extends into the cavity 64. The sheath 58 is operatively connected to the rod 56 proximate the second end 62 of the rod 56 such that sliding the sheath 58 relative to the rod 56 moves the sheath 58 between the corrugated position and the uncorrugated position. The sheath 58 and the rod 56 extend through the engagement slot 50 of the flange 48 in unison. In addition, the first end 60 of the rod 56 may extend through the covering 14 proximate the first portion 18. The sheath 58 may be operatively connected to the first portion 18 of the covering 14. Therefore, the rod 56 is slidable within the cavity 64, relative to the sheath 58 and the covering 14, between the corrugated position and the uncorrugated position to engage and disengage the flange 48. When the sheath 58 is in the corrugated position, the corrugations 68 engage the flange 48 such that the corrugations 68 are larger than the engagement slot 50 and are prevented from moving through the engagement slot 50, as shown in FIG. 5. Therefore, the corrugations 68 engage the flange 48 on one or both sides of the engagement slot 50 to prevent the sheath 58 and the rod 56 from moving the covering 14 relative to the flange 48. In addition, when the sheath 58 is in the uncorrugated position, the wall 66 of the sheath 58 are generally straight to allow the sheath 58 and the rod 56 to slide freely within the engagement slot 50 to move the front edge 16 to the desired maximum horizontal position, as shown in FIG. 6. To move the front edge 16 relative to the frame 12, the rod 56 may be moved or depressed toward the flange 48 to elongate and straighten the wall 66 of the sheath 58. To facilitate movement of the rod 56, a knob 70 may be disposed at the first end 60 of the rod 56. The first portion 18 of the covering 14 is disposed between the knob 70 and the flange 48 such that the knob 70 and the rod 56 are movable relative to the covering 14 to selectively move the sheath 58 between the corrugated and the uncorrugated positions to selectively engage and disengage the sheath 58 from the flange 48. It should be appreciated, however, that the invention is not limited to using a knob 70, as any other form of grasping and/or moving the sheath 58 and/or the rod 56 may also be used as known to those skilled in the art.

While the best modes for carrying out the invention have been described in detail, those familiar with the art to which this invention relates will recognize various alternative designs and embodiments for practicing the invention within the scope of the appended claims.

The invention claimed is:

1. An adjustable seat assembly for attachment to a floor of a vehicle to support thighs of a user of the vehicle, said adjustable seat assembly comprising:
   a frame presenting a support surface that extends generally horizontally;
   a covering that includes a first portion and a second portion in spaced relationship to said first portion;
   wherein said second portion extends over said support surface and said first portion is horizontally spaced from said second portion and said frame;
   wherein a front edge is defined at a tangent to said covering, between said first portion and said second portion, at a maximum horizontal distance from said frame such that at least a portion of said covering between said front edge and said second portion is for supporting the thighs of the user of the vehicle;
   wherein said covering includes a flexure region between said first portion and said second portion such that as said first portion is moved relative to said frame, said flexure region moves between a relaxed position and at least one of a plurality of tensioned positions to change said maximum horizontal distance between said frame and said front edge;
   an adjustment mechanism operatively connected to said covering and said frame such that said adjustment mechanism is configured to selectively retain said first portion relative to said second portion; and
   a thigh portion having a first part and a second part spaced from said first part;
   wherein said thigh portion includes a flexure portion, having an arched shape, disposed between said first part and said second part;
   wherein said flexure portion of said thigh portion is formed from a material that is resilient; and
   wherein said first part is operatively connected to said first portion of said cover and said second part is operatively connected to said frame such that said thigh portion changes shape between being generally C-shaped as said first portion is moved toward said frame and being generally straightened as said first portion is moved away from said frame.

2. An adjustable seat assembly, as set forth in claim 1, wherein said covering includes a cushion disposed over at least a portion of said frame.

3. An adjustable seat assembly, as set forth in claim 2, wherein said cushion defines a relief at said flexure region to prevent said cushion from gathering at said flexure region when said first end is moved relative to said frame to change said maximum horizontal distance between said first end and said frame.

4. An adjustable seat assembly, as set forth in claim 3, wherein said cushion is formed from foam.

5. An adjustable seat assembly, as set forth in claim 2, wherein said cushion is resilient.

6. An adjustable seat assembly, as set forth in claim 1, further comprising a flange extending from said frame such that said adjustment mechanism is operatively connected to said covering and said flange such that said adjustment mechanism is configured to selectively maintain said flexure region in one of said relaxed position and said at least one of said plurality of tensioned positions to set said maximum horizontal distance of said front edge relative to said frame.

7. An adjustable seat assembly, as set forth in claim 6, wherein said flange defines an engagement slot and said adjustment mechanism adjustably extends through said engagement slot for selectively engaging said flange to adjustably interconnect said covering and said flange, to establish said maximum horizontal distance.

8. An adjustable seat assembly, as set forth in claim 7, wherein said adjustment mechanism is a latch bar and said latch bar defines a plurality of teeth for selectively engaging said flange to interconnect said covering and said flange to establish said maximum horizontal distance.

9. An adjustable seat assembly, as set forth in claim 8, wherein said latch bar extends from said first portion of said covering.

10. An adjustable seat assembly, as set forth in claim 9, wherein said latch bar pivotally extends from said first portion of said covering.

11. An adjustable seat assembly, as set forth in claim 6, wherein said adjustment mechanism further includes a handle extending from said latch bar for grasping said latch bar to move said first portion relative to said flexure region between said relaxed position and said tensioned position to change said maximum horizontal distance between said frame and said front edge.

12. An adjustable seat assembly, as set forth in claim 6, wherein said adjustment mechanism includes:
   a rod extending between a first end and a second end;
   a sheath defining a cavity and a wall surrounding said cavity;
   wherein said rod extends into said cavity such that said wall surrounds said rod and said rod is operatively connected to said sheath proximate said second end;
   wherein said sheath and said rod extend through said engagement slot of said flange;
   wherein said sheath is operatively connected to said first portion of said covering such that said rod slides within said cavity, relative to said sheath and said covering between a corrugated position to engage said flange and an uncorrugated position to disengage said sheath from said flange to move said first portion of said covering relative to said frame to set said maximum horizontal distance of said front edge relative to said frame.

13. An adjustable seat assembly, as set forth in claim 12, wherein said wall of said sheath defines a plurality of corrugations for engaging said flange when said sheath is in said corrugated position and said wall of said sheath is generally straight when said sheath is in said uncorrugated position for disengagement from said flange to move said first portion of said covering relative to said frame to set said maximum horizontal distance of said front edge relative to said frame.

14. An adjustable seat assembly, as set forth in claim 12, wherein said adjustment mechanism further includes a knob at said first end of said rod, wherein said first portion of said covering is disposed between said knob and said flange such that said knob and said rod are movable relative to said covering to selectively corrugate and straighten said wall of said sheath for respectively engaging and disengaging said engagement slot of said flange.

15. An adjustable seat assembly, as set forth in claim 1, wherein said flexure region of said covering is generally U-shaped when said flexure region is in said relaxed position.

16. An adjustable seat assembly, as set forth in claim 1, wherein said flexure region is resilient.

17. An adjustable seat assembly, as set forth in claim 1, wherein said flexure region of said covering includes a concave surface and said flexure portion of said thigh portion includes a convex surface and said convex surface faces said convex surface of said covering to define said relief therebetween.

18. An adjustable seat assembly for attachment to a floor of a vehicle to support thighs of a user of the vehicle, said adjustable seat assembly comprising:
   a frame presenting a support surface that extends generally horizontally;
   a covering that includes a first portion and a second portion in spaced relationship to said first portion;
   wherein said second portion extends over said support surface and said first portion is horizontally spaced from said second portion and said frame;
   wherein a front edge is defined at a tangent to said covering, between said first portion and said second portion, at a maximum horizontal distance from said frame such that at least a portion of said covering between said front edge and said second portion is for supporting the thighs of the user of the vehicle;
   wherein said covering includes a flexure region between said first portion and said second portion such that as said first portion is moved relative to said frame, said flexure region moves between a relaxed position and at least one of a plurality of tensioned positions to change said maximum horizontal distance between said frame and said front edge;
   a flange extending from said frame;
   an adjustment mechanism operatively connected to said covering, proximate said first portion, wherein said adjustment mechanism is configured to selectively engage said flange and retain said first portion relative to said second portion; and
   a thigh portion having a first part and a second part spaced from said first part;
   wherein said thigh portion includes a flexure portion, having an arched shape, disposed between said first part and said second part;
   wherein said flexure portion of said thigh portion is formed from a material that is resilient; and
   wherein said first part is operatively connected to said first portion of said cover and said second part is operatively connected to said frame such that said thigh portion changes shape between being generally C-shaped as said first portion is moved toward said frame and being generally straightened as said first portion is moved away from said frame.

\* \* \* \* \*